Patented Oct. 8, 1935

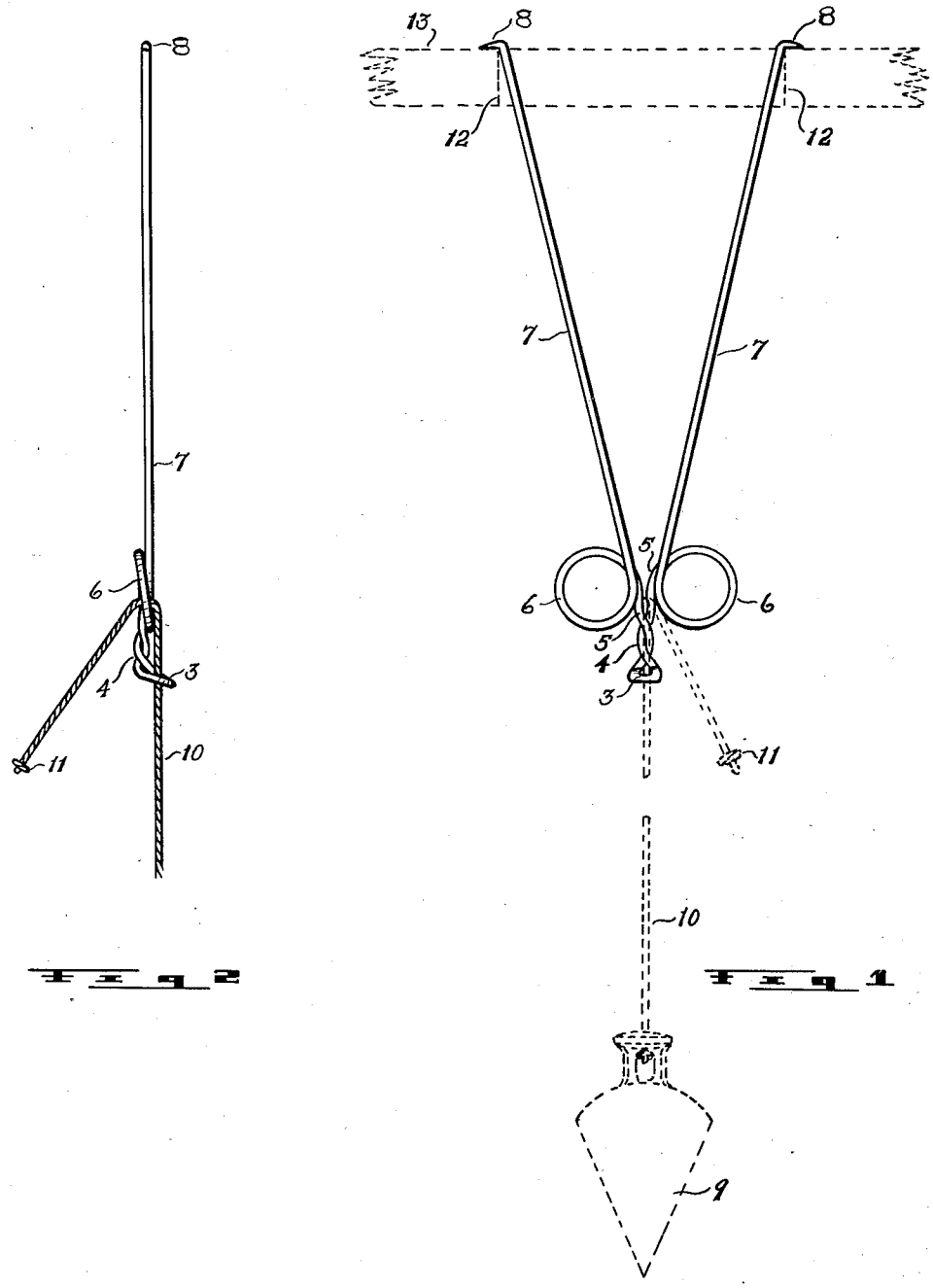

2,016,573

UNITED STATES PATENT OFFICE 2,016,573

PLUMB BOB SUPPORT

Carl Beck, Vancouver, British Columbia, Canada

Application August 30, 1934, Serial No. 742,089

3 Claims. (Cl. 33—207)

My invention relates to plumb bob supports and briefly stated comprises a single strand of wire twisted at its middle point to form a guide and fastening means for a plumb line and the two end portions of the wire forming arms for attaching the device in place.

One object of my invention is to provide a very simple device whereby the plumber or steamfitter may hang a plumb line from holes drilled in the ceiling and thus ascertain the point vertically below the center of such hole without necessitating his climbing to the floor above in order to fix the line.

A further object of this invention is to provide a plumb line support which automatically centers the line relative to the hole in which the device is hung, and to so construct the device that it may be used where only a limited space for attachment is available, such as in an aperture where a superimposed or side member prevents the line from being passed through the hole, this feature being especially valuable in many common wooden structures and in pipe ends, pipe T's, pipe elbows, and the like.

And a still further object of my invention is to provide a plumb support which shall be very light in weight, easily packed, yet durable and which can be manufactured at a minimum cost as compared with existing devices of this character.

I attain all these objects by the simple device illustrated in the accompanying drawing, in which:

Figure 1 is a view of the device showing in dotted lines a plumb line and bob as used therewith and also indicating how the device may be lodged in a hole in the ceiling.

Figure 2 is a side elevation of the device and a portion of a plumb line fastened therein.

Similar numerals refer to similar parts throughout the views.

In constructing my device, a single strand of suitable wire is formed with a small loop 3 and a twisted portion 4 midway of the length of the wire and a simple crotch is formed between the upwardly extending portions 5, 5, and two similar single turn coils 6, 6 are formed opposite said portions 5, 5, while the remaining portions of the wire are made straight to form arms 7, 7 which may be terminally bent and sharpened as at 8, 8.

The bob 9 and the plumb line 10 as used with this invention may be of any suitable character, this line being threaded through the loop 3 and a knot 11 at the end of this line preventing its complete withdrawal from the holder.

A portion of a ceiling is represented at 13 and the lines 12, 12 indicate a hole in this ceiling into which the device has been placed.

In use, the device is grasped in one hand by the arms 7, 7 which may be pressed sufficiently close together to allow the insertion of the ends 8, 8 into the aperture in which it is desired to lodge the device and the arms are then allowed to spring out to engage the sides of such aperture.

When the device is used with pipes, it has been found that the sharp points at 8, 8 provide adequate engagement with the inside surface of the pipe, whether threaded or unthreaded, and very little vertical space is necessary for satisfactory attachment of the device.

In use with nearly all constructions, the plumb line is automatically centered since the arms 7, 7 are of equal length and under equal spring tension.

The lowering of the bob to the desired position is accomplished by pulling the knot end of the line upwardly so that it runs freely through the loop 3 by reason of gravitational force acting on the bob, and the line is fastened at the proper point by pulling the knot end of the string downwardly so that it is engaged and held securely in the crotch at 5.

I am aware that several more or less elaborate devices having similar objects in view have been invented prior to this invention but the simplified form which I claim as new and desire to secure by Letters Patent of the United States is:

1. A plumb bob support constructed of a single strand of wire having a central twisted portion with a loop at one end, the remaining parts of the wire each having a coiled portion and a straight portion, substantially as described.

2. A plumb bob support comprising a base member crotched at one end and looped at the other end, and a pair of resilient arms secured to said base member.

3. A plumb bob support comprising a wire with a central twisted portion terminating in a loop at one end, the remaining portions of the wire diverging from said twisted portion and terminally bent outwardly and sharpened.

CARL BECK.